United States Patent
Schulz et al.

(10) Patent No.: US 11,257,597 B2
(45) Date of Patent: Feb. 22, 2022

(54) SYSTEMS AND METHODS FOR DEBRIS-FREE NUCLEAR COMPONENT HANDLING

(71) Applicant: Global Nuclear Fuel—Americas, LLC, Wilmington, NC (US)

(72) Inventors: Brett M. Schulz, Wilmington, NC (US); David W. Webber, Wilmington, NC (US)

(73) Assignee: Global Nuclear Fuel—Americas, LLC, Wilmington, NC (US)

( * ) Notice: Subject to any disclaimer, the term of this patent is extended or adjusted under 35 U.S.C. 154(b) by 332 days.

(21) Appl. No.: 16/237,628

(22) Filed: Dec. 31, 2018

(65) Prior Publication Data

US 2020/0211722 A1 Jul. 2, 2020

(51) Int. Cl.
*G21C 3/32* (2006.01)
*G21C 3/10* (2006.01)
*B65D 65/46* (2006.01)

(52) U.S. Cl.
CPC .............. *G21C 3/32* (2013.01); *B65D 65/46* (2013.01); *G21C 3/10* (2013.01)

(58) Field of Classification Search
CPC ........ G21C 3/32; G21C 3/3225; G21C 3/324; B65D 59/06; B65D 59/00; B65D 65/46
(Continued)

(56) References Cited

U.S. PATENT DOCUMENTS 2,635,996 A * 4/1953 Rohrback ............. C23F 11/184
166/310
2,906,683 A * 9/1959 Quackenbush ........ G21C 15/04
376/289

(Continued)

FOREIGN PATENT DOCUMENTS

| DE | 3236665 A1 * | 4/1984 | ............. G21C 3/334 |
|---|---|---|---|
| EP | 0514115 | 3/1996 | |
| JP | 2013200307 | 10/2013 | |

OTHER PUBLICATIONS

E. Bud Senkowski, Coatings Used in the Nuclear Industry, Protective Organic Coatings, vol. 5B, ASM Handbook, Edited by Kenneth B. Tatar, ASM International, 2015, p. 354-360, https://doi-org_proxy.dotlib.com.br/10.31399/asm.hb.v05b.a0006035 (Year: 2015).*

(Continued)

*Primary Examiner* — Jack W Keith
*Assistant Examiner* — Jinney Kil
(74) *Attorney, Agent, or Firm* — Ryan Alley IP

(57) ABSTRACT

Packaging structures and systems are used for handling components for use in a nuclear reactor. The packaging protects the component during transport and handling and then dissolves in liquid in the nuclear reactor or fuel pool. The packaging need not be removed and may block flow paths or otherwise interfere with operability were it not for its dissolution. The packaging may include shock absorbers in a fuel assembly or a seal on a water rod in the assembly. Mechanical, frictional, or chemical retaining materials may be used to secure the packaging and may also dissolve in the liquid. For a light water reactor, polymers, protein gels, and plastics can all be used where they will dissolve in the water and are otherwise compatible with reactor chemistry and neutronics. Materials with higher temperatures for solubility may be used because they will dissolve when reactor operations commence.

19 Claims, 3 Drawing Sheets

(58) Field of Classification Search
USPC .................................. 206/524.1, 524.7, 0.7
See application file for complete search history.

(56) References Cited

U.S. PATENT DOCUMENTS

| | | | | |
|---|---|---|---|---|
| 4,740,351 | A * | 4/1988 | Katsumizu | G21C 3/334 |
| | | | | 376/446 |
| 5,028,382 | A * | 7/1991 | King, Jr. | G21C 3/334 |
| | | | | 376/261 |
| 5,173,252 | A * | 12/1992 | Johansson | G21C 3/3424 |
| | | | | 376/448 |
| 5,867,548 | A | 2/1999 | Bitterman et al. | |
| 6,226,343 | B1 | 5/2001 | Frederickson et al. | |
| 7,329,441 | B2 * | 2/2008 | Catlin | B65D 65/46 |
| | | | | 206/524.1 |
| 2003/0054966 | A1 | 3/2003 | Bone et al. | |
| 2004/0065578 | A1 | 4/2004 | Bone et al. | |
| 2004/0144681 | A1 * | 7/2004 | Wiedemann | C11D 3/0052 |
| | | | | 206/524.7 |
| 2008/0081071 | A1 * | 4/2008 | Sanghvi | A61K 9/006 |
| | | | | 424/484 |
| 2008/0190808 | A1 * | 8/2008 | Patel | B32B 9/02 |
| | | | | 206/524.7 |
| 2009/0129529 | A1 | 5/2009 | Wazybok et al. | |
| 2011/0150163 | A1 * | 6/2011 | Bausch | C10M 173/02 |
| | | | | 376/267 |
| 2012/0155601 | A1 * | 6/2012 | Makovicka | G21C 3/322 |
| | | | | 376/399 |
| 2013/0251088 | A1 | 9/2013 | Martin et al. | |
| 2014/0064434 | A1 | 3/2014 | Martin | |
| 2015/0191607 | A1 | 7/2015 | McDaniel | |
| 2016/0215164 | A1 * | 7/2016 | Hong | G21C 3/07 |
| 2018/0082761 | A1 | 3/2018 | Minor et al. | |

OTHER PUBLICATIONS

WIPO, International Search Report in Corresponding PCT Application PCT/US2019/069074, dated Apr. 29, 2020.
WIPO, Written Opinion in Corresponding PCT Application PCT/US2019/069074, dated Apr. 29, 2020.

* cited by examiner

SYSTEMS AND METHODS FOR DEBRIS-FREE NUCLEAR COMPONENT HANDLING

BACKGROUND

FIG. 1 is an illustration of a conventional nuclear reactor fuel assembly 10 typically used in commercial nuclear power reactors for electricity generation throughout the world. Several fuel assemblies 10 are placed in a reactor in close proximity to sustain a nuclear chain reaction. A fluid moderator and/or coolant conventionally passes through fuel assembly 10 in a length-wise (axial) direction, enhancing the chain reaction and/or transporting heat away from the assembly 10.

As shown in FIG. 1, fuel assembly 10 includes multiple fuel rods 14 containing fissile material and extending in the axial direction within the assembly 10. Fuel rods 14 are often seated into lower tie plate 16 and extend upward into upper tie plate 17 at ends of fuel assembly 10. Fuel rods 14 may be bounded by a channel 12 that forms an exterior of the assembly 10, maintaining fluid flow within assembly 10 throughout the axial length of assembly 10. Conventional fuel assembly 10 may also include one or more fuel spacers 18 at various axial positions. Fuel spacer 18 permits fuel rods 14 to pass through grid openings in spacer 18, thereby aligning and spacing fuel rods 14. One or more water rods 19 may also be present to provide a desired level of moderator or coolant through-flow to assembly 10.

During plant fabrication or an operational outage for maintenance and refueling, one or more assemblies 10 are installed, moved, or removed within a nuclear reactor core. Typically, several new, or fresh, fuel assemblies 10 are received at the plant prior to the outage for adding during this period. Fresh fuel assemblies 10 may be shipped by rail, freight, or any other transport means from a fuel fabricator, typically at only a few locations that are necessarily remote from the plant. Upon receipt, assemblies 10 are unloaded, unpackaged, inspected, and then moved into temporary storage, such as a fuel pool, prior to moving into the reactor during the maintenance period.

SUMMARY

Example embodiments include packaging structures and systems for nuclear reactor components. The packaging can be fixed in or about the component for transport and then dissolved in a liquid coolant or moderator of the nuclear reactor upon installation of the component. The component can be any structure or tooling in the reactor or a fuel pool that will be exposed to the liquid coolant. Because the packaging will dissolve without necessarily needing to be removed, it can be installed in flow paths and blocking passage through or between components, or in difficult-to reach spaces in or between components. For example, packaging may take on the form of padding between a fuel assembly spacer and a channel in the assembly, or a flow restrictor seated on a water rod in the assembly. Frictional fits and/or soluble adhesives may be used to retain the packaging with respect to the component, and such adhesives may be directly applied to the packaging and components. In the instance of a light water reactor using deionized water as a coolant and moderator, polyurethanes, polysaccharides like an agar, gels, and/or plastics like PVA can all be used where they will dissolve in the water. Or, materials with higher temperatures required for solubility, such as operating temperatures at or over 100 degrees Celsius, may be used to keep packaging in place on the immersed component until operations commence.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
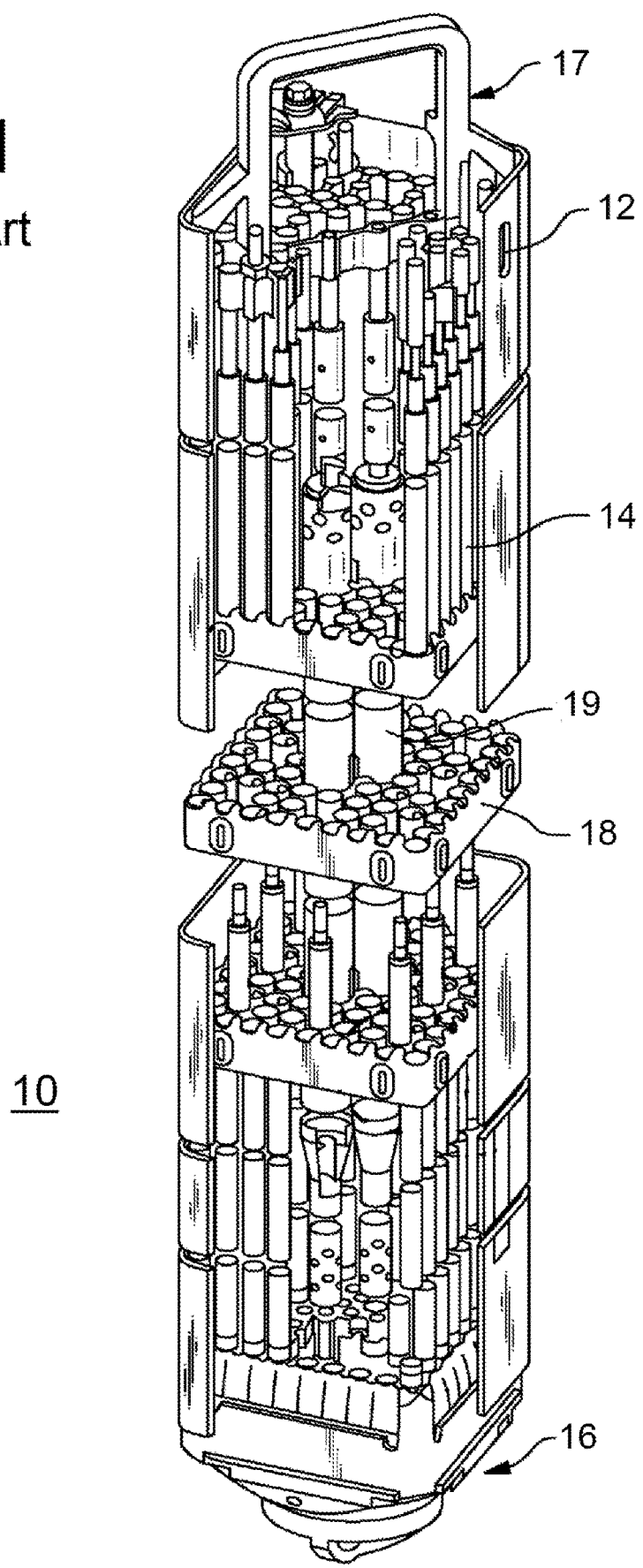
FIG. 1 is an illustration of a related art nuclear fuel assembly.

Because this is a patent document, general, broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the terms "and," "or," and "and/or" include all combinations of one or more of the associated listed items unless it is clearly indicated that only a single item, subgroup of items, or all items are present. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and the are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, "axial" and "vertical" directions are the same up or down directions oriented along the major axis of a nuclear reactor, often in a direction oriented with gravity. "Transverse" directions are perpendicular to the "axial" and are side-to-side directions oriented in a single plane at a particular axial height.

The Inventors have recognized that fuel assemblies are subjected to a variety of shocks and strains during packaging, shipping, installation, and handling that cover a wide array of force profiles on the assembly. As such, it is desirable to minimize vibration and maintain fuel rods in particular positions in a fuel assembly to minimize risk of damage. It is further desirable to avoid increase of foreign or broken materials during shipping and handling, including dust or particulate matter that may settle in assembly openings or become lodged in contact spaces. The Inventors have further recognized that extensive packaging and fuel assembly modification may be required to guard against these shocks and foreign matter during shipping and handling, including separators, occlusion devices, wraps, cushions, bathtubs, crates, and/or other supporting and sealing structures that must be removed prior to use. The removal of this packaging may be time-consuming and itself subject assemblies to damage, and multiple pieces of packaging increase the risk that one is missed and left on the assembly during use, introducing foreign matter into the reactor. Example embodiments and methods described below address these and other problems recognized by Inventors with unique solutions enabled by example embodiments.

The present invention is systems for handling nuclear reactor components, components including the same, and methods of use and manufacture of the same. In contrast to the present invention, the few example embodiments and example methods discussed below illustrate just a subset of the variety of different configurations that can be used as and/or in connection with the present invention.

Example embodiments include reactor-fluid-soluble packaging, like cushions, separators, caps, containers, etc. that can be placed in, attached to, and/or surround nuclear reactor components. These structures, collectively or individually, are referred to as packaging or packaging components. The packaging may act as cushions and be compressible and resist deformation in dry or open-air environments, such as during shipping of the nuclear component or its use outside the reactor, to absorb shocks. The packaging may additionally or alternatively seal areas from foreign bodies in dry or open-air environments. Once immersed in reactor coolant and/or moderator, which is typically liquid water of various chemistries, example embodiment packaging dissolves into the water with minimal impact on overall reactor chemistry or interference with neutronics. Such dissolution removes the possibility of a foreign solid body or structure in the reactor coolant that could damage other structure from impact or fretting.

Example embodiment soluble items can be fabricated of any material with solid properties for shock-absorption or occluding that dissolves in reactor coolant and/or moderator in which its parent component will be immersed during operation. The material may even be relatively insoluble in coolant and/or moderator until operating conditions are reached, such as where radiation levels are elevated and this liquid will be at temperatures of 100° Celsius or more and flowing under higher pressure, for example. As used herein, "soluble" refers to materials requiring, by mass, 30 or fewer parts of solvent to dissolve a part of the material. Further, "soluble" packaging has surface area and other physical configuration to fully dissolve in reactor coolant within 2 hours at reactor operating temperatures and pressures. "Soluble" packaging materials thus also includes parent materials that may be slightly or highly insoluble but decompose in liquid or at reactor operating conditions to materials having the soluble properties to dissolve within this timeframe. In this way, soluble packaging for nuclear components may provide handling, separation, shock absorption, occlusion, and/or containment functions throughout shipping and up through installation in a nuclear reactor and then dissolve during operation when no longer needed.

The material may be a chemically relatively stable and low nuclear cross section material, whether organic or inorganic. For example, polymers including lighter-weight and/or less cross-linked polyurethanes, a degradable polyester like polycaprolactone, or a polysaccharide like agar; mixed gels like gelatin; a soluble silicate; and/or several types of moldable plastics like polyvinyl alcohols may provide good physical separation and shock absorption in open air while harmlessly dissolving in reactor coolant without impact on reactor chemistry or neutronics. For items that will dissolve directly into reactor moderator passing through the fuel, neutron poisons, corrosive substances, and other operationally-degrading materials like boron-containing compounds and halides may be avoided.

Example embodiment soluble packaging items may be placed on any nuclear component in any position, including those that are difficult to manually reach to remove the item prior to use, because the item will harmlessly dissolve. For example, padding or cushions between separated fuel structures, packaging around whole assemblies, seals or occlusive elements placed in or around reactor structures, etc. may all be soluble in reactor coolant and/or moderator and usable as example embodiments. Soluble adhesives, such as a polypeptide glue, or other polymer, may secure the items in place, as well as mechanical shapes that limit movement. These items may be placed during component manufacture or during shipping and handling, and optionally removed or left in place at installation in the reactor.

Figure 2:
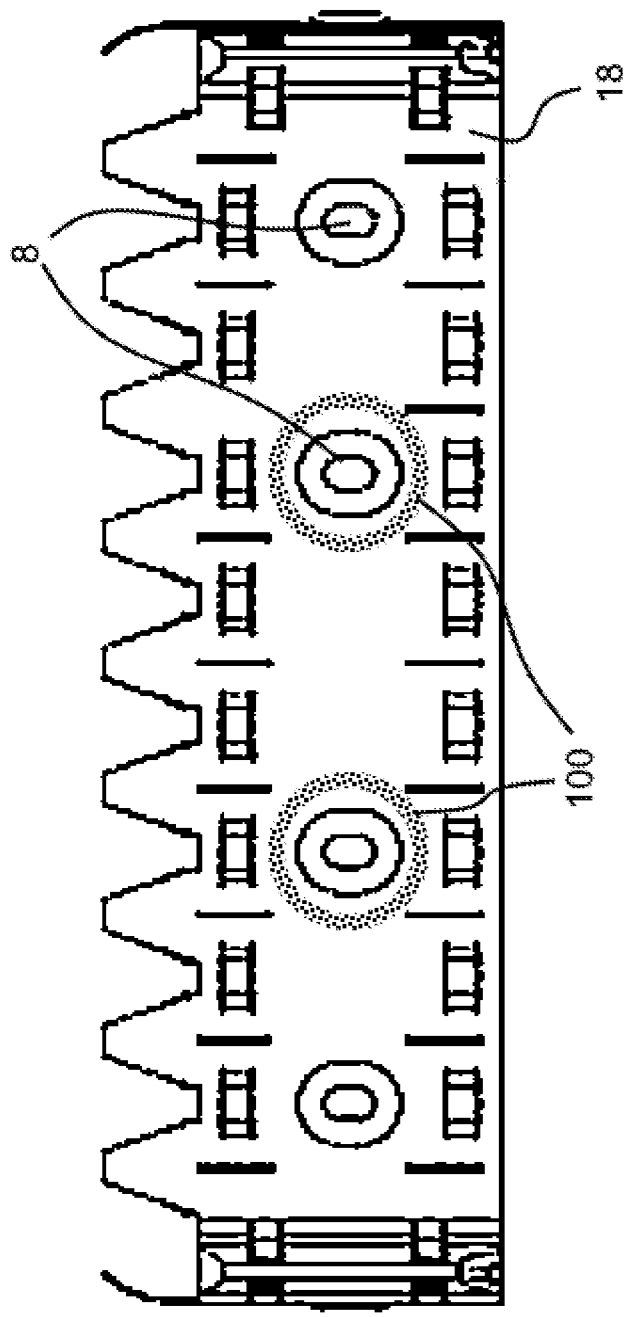
FIG. 2 is an illustration of an example embodiment soluble cushion in use in a nuclear fuel assembly.

FIG. 2 is an illustration of an example embodiment soluble cushion 100 for separating internal components of a nuclear fuel assembly, here, spacer 18. As shown in FIG. 2, an outer band of spacer 18 may include several bathtubs 8 that brace spacer 18 from an outer channel (not shown) exterior to spacer 18. Bathtubs 8 may be particularly susceptible to compression and damage in response to a shock such as a sudden lateral load on an assembly containing spacer 18. Example embodiment soluble cushion 100 are O-shaped cushions placed around bathtubs 8 having a thickness, or a transverse length into the image of FIG. 2, greater than bathtubs 8 to contact a channel before bathtubs 8 and protect the same from impacts. Example embodiment cushions 100 may be placed at select or all bathtubs 8, and may be held in place by a soluble adhesive or through frictional contact between spacer 18 and a surrounding channel.

Because example embodiment cushions 100 are fabricated of a soluble material, they do not necessarily require removal prior to installation of a containing nuclear fuel assembly in a reactor. This may be especially useful because, as shown in FIG. 1, with channel 12 rigidly surrounding fuel rods 14 and spacers 18, it may be difficult to access cushions 100 where they would be placed around bathtubs 8 interior to channel 12 and at midpoints of the assembly. Instead, cushions 100 may brace and protect bathtubs 8 from impacts in dry or open air conditions of transport, and, when placed in water in a reactor during installation of the containing assembly, simply dissolve without generating debris or blockage in the assembly or reactor. In this way spacer 18 and its containing assembly are protected from damage due to impact shocks during transportation, handling, and other non-submerged operations and allowed full and normal liquid moderator and/or coolant through-flow during submerged operations. Of course, while example embodiment cushions 100 are shown surrounding bathtubs 8 on spacer 18, they may be placed in other locations and on other components requiring bracing or impact protection from nearby surfaces.

Figure 3:
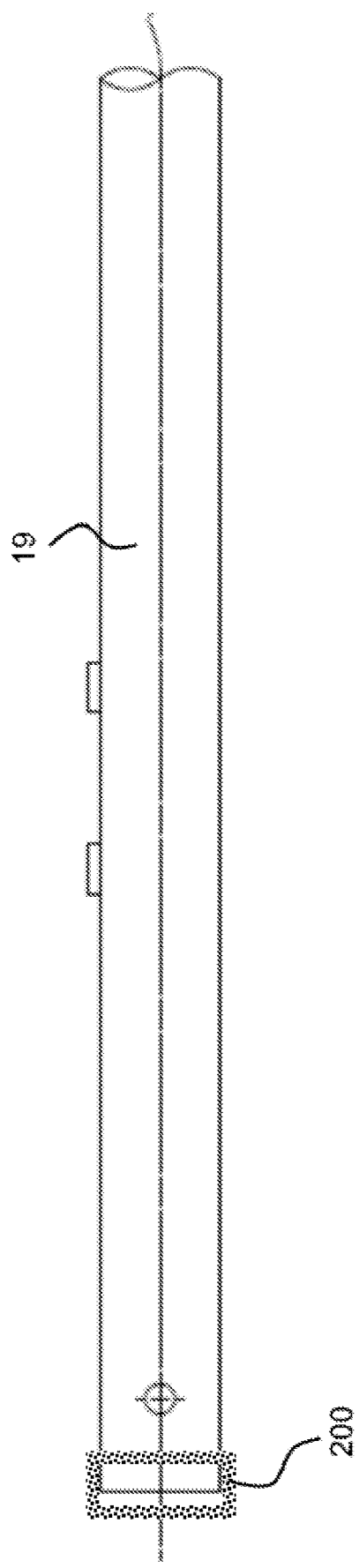
FIG. 3 is an illustration of an example embodiment soluble cap in use in a nuclear fuel assembly.

FIG. 3 is an illustration of an example embodiment soluble water rod cap 200 for closing components of a nuclear fuel assembly, here, water rod 19. As shown in FIG. 3, water rod 19 may have open ends that during operation allow water or another moderator to pass through the same for improved neutronics. During assembling, shipping, and handling, debris like dust or loose pieces may enter into water rod 19. Example embodiment soluble water rod cap 200 closes off water rod 19 from such debris by seating onto an end of water rod 19. Example embodiment caps 200 may be placed at one or more ends of one or more water rods 19, and may be held in place by a soluble adhesive or through frictional contact between water rod 19 and cap 200 fitted to a cylindrical end of water rod 19.

Because example water rod caps 200 are fabricated of a soluble material, they do not necessarily require removal prior to installation of a containing nuclear fuel assembly in a reactor. This may be especially useful to prevent debris entry into water rod 19 throughout transport and right up to the moment of insertion into the reactor, where no further new debris could enter water rod 19 and migrate to the reactor. When placed in water or other solvent in the reactor during installation of the containing assembly, example embodiment water rod caps 200 simply dissolve without generating debris or blockage in the assembly or reactor. In this way water rod 19 and its containing assembly are protected from damage due to debris during transportation, handling, and other non-submerged operations and allowed full and normal liquid moderator and/or coolant through-flow during submerged operations. Of course, while example embodiment caps 200 are shown surrounding ends of water rod 19, they may be placed in other locations and on other components requiring bracing or impact protection from nearby surfaces.

Example embodiment cushions 100 and water rod caps 200 are useable in combination in a same assembly. Cushions 100 and caps 200 may also be used in other nuclear reactor components with proper sizing. Similarly, other example embodiment soluble packaging, occluding, and/or securing items may be used in other combinations in other fuel positions and/or in other components.

Example embodiments and methods thus being described, it will be appreciated by one skilled in the art that example embodiments may be varied and substituted through routine experimentation while still falling within the scope of the following claims. For example, any number of different nuclear reactor components can be cushioned, closed, braced, packaged, and/or secured by example embodiment soluble packaging, which can be used in several different types of reactor components and designs, simply through proper shaping and dimensioning of example embodiments. Such variations are not to be regarded as departure from the scope of these claims.

What is claimed is:

1. A system for handling components to be installed in a nuclear reactor cooled or moderated by a liquid, the system comprising:
    a nuclear reactor component; and
    a packaging component secured to the nuclear reactor component, wherein the packaging component is fabricated of at least one of a polyurethane and a polyester, and wherein the packaging component is soluble in the liquid.

2. The system of claim 1, wherein the nuclear reactor component is a nuclear fuel assembly, and wherein the packaging component directly impedes a flow path in the nuclear fuel assembly until dissolved.

3. The system of claim 2, wherein the packaging component is at least one of a cushion and a cap in the nuclear fuel assembly.

4. The system of claim 3, wherein the packaging component is a cushion secured between a spacer and a channel in the nuclear fuel assembly or a cap secured to an end of a water rod in the nuclear fuel assembly.

5. The system of claim 1, wherein the packaging component is directly joined to the nuclear reactor component with an adhesive that is soluble in the liquid.

6. The system of claim 1, wherein the packaging component is fabricated of polycaprolactone.

7. The system of claim 1, wherein the packaging component dissolves when the liquid reaches 100 degrees Celsius.

8. The system of claim 1, wherein the packaging component includes a cushion positioned between two structures in the nuclear reactor component or a cap sealing an end of an open conduit in the nuclear reactor component.

9. The system of claim 1, wherein the packaging component does not include any halide or element having a thermal neutron cross section over 1 barn.

10. The system of claim 1, wherein the liquid is deionized light water.

11. A packaged nuclear fuel assembly comprising:
    a plurality of nuclear fuel rods arranged in a grid;
    a spacer having a plurality of openings through which the nuclear fuel rods pass;
    a channel surrounding the spacer and the nuclear fuel rods;
    a water rod extending among the nuclear fuel rods; and packaging for transport of the nuclear fuel assembly, wherein the packaging is soluble in water, and wherein the packaging includes a cap secured to an end of the water rod to prevent flow through the water rod until dissolved.

12. The assembly of claim 11, wherein the packaging includes a cushion secured between the spacer and the channel.

13. The assembly of claim 11, wherein the packaging is directly joined to the nuclear fuel assembly with an adhesive that is soluble in the water.

14. The assembly of claim 11, wherein the packaging consists only of a polyurethane, a polysaccharide, a moldable plastic, a polyester, or combinations thereof.

15. The system of claim 11, wherein the packaging dissolves when the liquid reaches 100 degrees Celsius.

16. The assembly of claim 11, wherein the packaging does not include any halide or element having a thermal neutron cross section over 1 barn.

17. A packaged nuclear fuel assembly to be installed in a nuclear reactor cooled or moderated by a liquid, the assembly comprising:
   a plurality of nuclear fuel rods arranged in a grid;
   a water rod extending among the nuclear fuel rods; and
   a cap secured to an end of the water rod to prevent flow through the water rod until dissolved, wherein the cap is soluble in the liquid.

18. The system of claim 17, wherein the cap is fabricated of at least one of a polyurethane, a polysaccharide, a moldable plastic, and a polyester.

19. The system of claim 17, wherein the cap is secured to the water rod with an adhesive that is soluble in the liquid.

* * * * *